United States Patent
Jorgensen et al.

(10) Patent No.: US 7,137,821 B2
(45) Date of Patent: Nov. 21, 2006

(54) TEST ITEM DEVELOPMENT SYSTEM AND METHOD

(75) Inventors: Margaret A. Jorgensen, San Antonio, TX (US); Kelly Van Houten-King, San Antonio, TX (US); Douglas A. Gardner, San Antonio, TX (US)

(73) Assignee: Harcourt Assessment, Inc., San Antonio, TX (US)

( * ) Notice: Subject to any disclaimer, the term of this patent is extended or adjusted under 35 U.S.C. 154(b) by 35 days.

(21) Appl. No.: 10/959,916

(22) Filed: Oct. 7, 2004

(65) Prior Publication Data

US 2006/0078864 A1    Apr. 13, 2006

(51) Int. Cl.
*G09B 7/00*    (2006.01)

(52) U.S. Cl. .................. 434/323; 434/236; 434/322

(58) Field of Classification Search ............. 434/118, 434/169, 201, 236, 307 R, 308, 322, 323, 434/336, 350, 362, 365; 715/863
See application file for complete search history.

(56) References Cited

U.S. PATENT DOCUMENTS

| | | | | |
|---|---|---|---|---|
| 5,344,326 A | * | 9/1994 | Ferris | .......................... 434/336 |
| 5,596,698 A | * | 1/1997 | Morgan | ....................... 715/863 |
| 6,120,297 A | * | 9/2000 | Morse et al. | ................ 434/169 |
| 6,164,975 A | * | 12/2000 | Weingarden et al. | ....... 434/322 |
| 6,431,875 B1 | | 8/2002 | Elliot et al. | |
| 6,808,392 B1 | * | 10/2004 | Walton | ........................ 434/236 |
| 2002/0006603 A1 | * | 1/2002 | Peterson et al. | ............ 434/365 |
| 2002/0182573 A1 | * | 12/2002 | Watson | ....................... 434/236 |
| 2003/0134261 A1 | | 7/2003 | Jennen et al. | |

* cited by examiner

*Primary Examiner*—Joe H. Cheng
(74) *Attorney, Agent, or Firm*—Allen, Dyer, Doppelt, Milbrath & Gilchrist, P.A.

(57) ABSTRACT

An assessment system includes interim tests administered at predetermined intervals. Each assessment is designed to test specific concepts, and includes multiple-choice test items, each having an item stem, a correct answer, and several distractors. Preferably at least two of the distractors are directed to disparate cognitive levels. Any distractors selected are automatically correlated for each student, in order to determine a presence of a possible problem in a particular concept. Then an individual focus can be applied to correcting any problems. Any distractors selected by any of the students are automatically correlated for the teacher, to determine the presence of a possible problem for a number of students, for applying focus to improving the understanding of some or all of a class for any problem identified by the correlation. A benchmark assessment is also administered that has a format substantially identical to that of an upcoming high-stakes test.

18 Claims, 11 Drawing Sheets

Create Another Report

Rogers Junior High
Heidi Evans, Grade 7 - Today's date: 10/18/2004

Kris Belton
DOB: 3/15/1991

Interim Roster Results
Interim D, assigned 10/15/2004

| Standards covered | Points earned of possible points | view all review items Items to review | view summary results Cumulative Score on All ClassLinks |
|---|---|---|---|
| ○ Math 7.2 →201 | 1 of 1 →202 | 0 | 2 of 3 →204 |
| ○ Math 7.4 | 2 of 3 | 18/2 →205 | 3 of 4 |
| ○ Math 7.1 | 0 of 1 | 2 | 0 of 1 |
| ○ Math 7.5 | 1 of 1 | 0 | 1 of 1 |
| ○ Math 7.3 | 0 of 3 | 4.26 | 2 of 4 |
| ○ Math 8.1 | 3 of 3 | 0 | 3 of 3 |
| ○ Math 8.2 | 0 of 2 | 21 | 2 of 3 |

∧ Back to Top

Tools
Print report (PDF format)
Download data (CSV flat file)

< previous    next >

203 — Alert Levels: None, Low, Medium, High

FIG. 4

Create Another Report

Rogers Junior High
Heidi Evans, Grade 7 - Today's date: 10/18/2004

Kris Belton
DOB: 03/18/1991

Interim Student Response Summary
Interim D, assigned 10/15/2004

Math 7A: Locate and name points on a coordinate plane using ordered pairs of integers. — 206

Q7  Which quadrant would the first pair of values on — 207
    this table be in when graphed correctly onto a
    coordinate grid?

| x | -4 | -2 | 0 | 2 | 4 |
|---|----|----|---|---|---|
| y | 2  | 1  | 2 | 4 | 7 |

208 —  Correct  ⟩ A  I
                  B  II
       Student Answer ⟩ C  III
                       D  IV
                  — 209

Item Response Rationale for option D: response reflects a conceptual error: confusion between x and y
— 210

∧ Back to Top
Tools
Print report (PDF format)
Download data (CSV flat file)

<previous    next>

[ Create Another Report ]                                                           211

Rogers Junior High                                                    View
Lorraine Thomsen - Grade 7 - Reading - Today's date: 11/19/2004  [ Entire roster ▼ ]

Period 3 Language Arts - Total Students: 30

---

Interim Roster Results
Interim A, 20 students completed as of today

| View student's assessment history | LA 7.3 ◯ 5 points | LA 7.1 ◯ 4 points | LA 7.2 ◯ 5 points | LA 6.9 ◯ 2 points | LA 6.8 ◯ 4 points | LA 5.9 ◯ 5 points | 217 |
|---|---|---|---|---|---|---|---|
| Arnold Delorey | 5 | [1] | *Use reading strategies such as making inferences and predictions, summarizing, paraphrasing, differentiating fact from opinion, drawing conclusions, and determining the author's purpose and perspective to comprehend written selections* | | | 4 | see review items |
| Adrian Durazo | 5 | [0] | | | | 5 | see review items |
| Milton Boivin | 4 | [1] | | | | [3] | see review items |
| Simone Baucom | [4] | [0] | | | | 5 | see review items |
| Cecil Erion | [2] | [1] | | | | 5 | see review items |
| Ron Schober | [3] | [0] | | | | [2] | see review items |
| Estela Tillman | 5 | [1] | 4 | 3 | 4 | [0] | see review items |
| Vergie Schlottmann | 4 | [1] | 5   216 | 2 | 2 | [3] | see review items |
| Eliza Pasquariello | [2] | [1] | 5 | [0] | 3 | 5 | see review items |
| Edgar Pascarella | [1] | [2] | [2] | 3 | 0 | 5 | see review items |
| Estela Manzanares | 5 | [0] | [2] | [1] | 4 | 5 | see review items |
| Deana Labounty | 5 | [1] | [3] | [2] | 4 | 4 | see review items |
| Franklin Hurdle | 5 | [0] | [1] | 3 | 4 | 4 | see review items |
| Harvey Madlock | 4 | [0] | [3] | 3 | 4 | 3 | see review items |
| Claude Yantis | 5 | [1] | [3] | 3 | 2 | 4 | see review items |
| Billy Lawyer | 5 | [1] | 5 | [3] | 3 | 5 | see review items |
| Elmer Axley | 5 | [1] | 5 | 3 | 1 | 4 | see review items |
| Margo Wachtel | [3] | 4 | 4 | [2] | 1 | [0] | see review items |
| Adrian Jourdan | 4 | [0] | 5 | [2] | 4 | [1] | see review items |
| Willa Mcamis | [3] | [1] | 5 | 3 | 1 | 5 | see review items |

∧ Back to Top                                                  < previous    next >

Tools
Print report (PDF format)                                      215
Download data (CSV flat file)

Create Another Report

Harris Middle School
Amy Brock - Grade 6 - Mathematics - Today's date: 12/04/2004
Estela Manzanares
DOB 12/15/1994

Interim Student Summary

View student's results on an assessment — 230

View: Entire group ▶

FIG. 8

|  | Cumulative Score — 231 | Int. C assigned 09/15/2004 | Int. B assigned 10/26/2004 | Int. A — 234 assigned 11/30/2004 |  |
|---|---|---|---|---|---|
| Math 117.3 | 4 of 5 | 1 of 1 | 1 of 1 | 2 of 3 | see review items |
| Math 117.2 | 6 of 9 | 0 of 3 | 4 of 5 | 1 of 1 | see review items |
| Math 117.4 | 2 of 5 | 0 of 1 | 0 of 2 | 2 of 2 | see review items |
| Math 117.1 | 5 of 6 | 1 of 1 | 1 of 1 | 3 of 4 | see review items |
| Math 117.5 | 6 of 9 | 2 of 3 | 3 of 5 | 1 of 1 | see review items |
| Math 118.1 | 7 of 14 | 0 of 7 | 6 of 10 | 1 of 2 | see review items |
| Math 118.2 | 4 of 7 | 1 of 1 | 0 of 4 | 3 of 5 | see review items |
| Math 115.1 | 12 of 14 | 9 of 11 | 2 of 2 | 1 of 1 | see review items |
| Math 121.2 — 235 | 10 of 13 | 1 of 1 | 1 of 1 | 8 of 10 | see review items |
| Math 120.1 model addition and subtraction situations involving fractions with objects, pictures, words, and numbers. | 5 of 6 | 2 of 3 | 1 of 1 | 2 of 2 | see review items |
|  | 2 of 4 | 2 of 3 | 1 of 1 | 1 of 1 | see review items |
|  | 3 of 5 | 0 of 1 | 0 of 3 | 1 of 1 | see review items |
|  | 4 of 7 | 2 of 3 | 1 of 1 | 0 of 3 | see review items |
|  |  |  | 3 of 4 | 1 of 1 | see review items |

< previous    next >

∧ Back to Top
Tools
Print report (PDF format)
Download data (CSV flat file)

Create Another Report

Mountain ISD
Mrs. Lauren Williams - Reading - Today's date: 02/15/2005
Harris Elementary - 4th Grade - Total Students: 121

Benchmark Group Results

View: Entire Group ▶ — 242

— 243

Benchmark A — 244
Total number of students completed: 101
37% | 70% prof. level | 100% — 245
This group's average score is 33 percentage points below proficiency Benchmark B
Total number of students completed: 116
72% | 70% prof. level | 100%
This group's average score is 2 percentage points above proficiency Student Proficiency — 246

247  248
         Below  Above
Benchmark A   42%   58%
Benchmark B   25%   75%

∧ Back to Top
Tools
Print report (PDF format)
Download data (CSV flat file)

<previous   next>

FIG. 10

TEST ITEM DEVELOPMENT SYSTEM AND METHOD

BACKGROUND OF THE INVENTION

1. Field of the Invention

The present invention relates to student assessment systems and methods, and, more particularly, to systems and methods for designing and creating such assessments.

2. Description of Related Art

Instruments created to examine a student's knowledge of a particular discipline typically include a series of questions to be answered or problems to be solved. Tests have evolved from individually authored, unitarily presented documents into standardized, multiauthor documents delivered over wide geographic ranges and on which multivariate statistics can be amassed. As the importance of test results has increased, for myriad educational and political reasons, so has the field of test creation experienced a concomitant drive towards more sophisticated scientific platforms, necessitating increased levels of automation in every element of the process.

With the "No Child Left Behind" initiative, school districts are increasingly focusing on individual students' performance on a specific subset of content standards measure on an accountability test. The consequences are high if adequate yearly progress is not demonstrated. However, adequate yearly progress is defined on total test performance, not performance on individual content standards.

Educators do not want assessment content to narrow the curriculum. Teachers want to teach more than what is tested in the accountability arena. Content standards tend to be hierarchical; students often need to learn the foundational skills before moving on to more complex skills. Other standards are recursive and cumulative, but it may be that only the more complex skills are being monitored. It would be beneficial to track what is taught and what is learned on the path to proficiency.

Traditional multiple-choice test items are developed to have one correct answer and three or four incorrect answers that are equally attractive to the test taker who does not know the correct answer. These wrong answers usually reflect wrong answers that students would make if they were asked to answer the question without seeing the incorrect answers. However, these wrong answers must be equally viable and therefore equally attractive wrong answers. Consequently, these wrong answers often reflect the same level of breakdown in student understanding. For example, in the content area of reading, if the question asks what the main idea of the passage is, the wrong answers are likely to each be an important detail or aspect of the passage.

When creating an item, the incorrect options, or distractors, have previously been less important in writing and editing an item than the correct answer has been. Distractors are generally structured to reflect typical student errors, but, in general, information about those errors and what they reveal about student cognition has not been collected and analyzed. This is probably due to the focus on measuring student achievement as opposed to indicating the limitations of student understanding.

It is also typical that, in a traditional multiple-choice test question, each of the distractors would be at one level of understanding depending upon the difficulty target of the question.

SUMMARY OF THE INVENTION

The present invention addresses a need to know (1) the degree to which a student has learned a specific concept to the level of a predetermined content standard, and (2) if a student is at risk of not earning a score of "proficient" on an accountability test, such as a high-stakes test. The system of the present invention provides a means for tracking that is organized the way teachers teach, and for tracking the specific combination of content standards as measured on an accountability test. These dual results enable teachers, parents, students, and administrators to track with precision the progress of each student, and also to determine any areas that appear to have a teaching deficiency, if, for example, a large number of students in the same class do not appear to have sufficiently grasped a particular concept.

The present invention comprises a plurality of assessment systems, two systems in a particular embodiment, although this is not intended as a limitation. A first system comprises a test, and, more typically, a plurality of interim tests, which provide a method for tracking student learning. This aspect of the method comprises the step of administering an interim assessment to a plurality of students being taught by a teacher. Each assessment is designed to test a set of specific concepts in a content area. Each assessment comprises a plurality of multiple-choice test items, each of which in turn comprises an item stem, a unitary correct answer, and a plurality of distractors. Preferably at least two of the distractors are directed to disparate cognitive levels, in that the distractors follow a taxonomy of understanding having a number of levels commensurate with the number of choices offered on each test item.

Following the administration of each of the interim assessments, any distractors selected by the student are automatically correlated, for each student. Such a correlation is adapted to indicate a presence of a possible problem in a cognitive level achieved by the student in a particular concept. Armed with such a correlation, an individual focus can be applied to investigating and correcting any such problems for that student, for example, prior to being administered a high-stakes test.

Also following the administration of each of the interim assessments, anydistractors selected by the plurality of students are automatically correlated for the teacher. Such a correlation is adapted to indicate a presence of a possible problem in a cognitive level achieved by a significant number of the students in a particular concept. Armed with this correlation, focus can be applied by the instructional staff, such as a teacher, to improving the understanding of some or all of an entire class for any such problems identified by the correlation, again, for example, prior to the administration of a high-stakes test.

A second system comprises at least one benchmark assessment, which is administered in preparation for an administration of a high-stakes test. The benchmark assessment comprises a format substantially identical to that of the high-stakes test, and typically has fewer test items than does the high-stakes test; so the time required for its administration is shorter.

It is to be understood herein that the term "student" is not intended to be limited to a school attendee; rather, a target of the test items of the present system and method may comprise, for example, a person desiring certification or skill improvement in a particular field or profession, such as a technical, legal, medical, or other discipline. The creation and manipulation of test items for any venue are thus intended to be encompassed under the present invention, as well as tests delivered by any means known in the art, including via hard copy, computer, and Internet access.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1–10.

The system 10 (FIG. 1) and method 100 (FIGS. 2A–2B) of the present invention are directed to the design and administration of assessment items that lead to an understanding of student cognition, a method for collecting and correlating assessment results, and for designing a differentiated instructional program specifically directed to the correlation. Similarly, a correlation of assessment results classwide can inform possible deficient areas of teaching, around which a classwide (or a subset thereof differentiated instructional program can be designed.

Table 1 provides, for the subject of reading, a four-level distractor rational taxonomy that would be appropriate for designing a four-option multiple-choice test question with one correct and three incorrect answers. It will be clear to one of skill in the art that a similar table could be developed for questions having a different number of choices.

TABLE 1

| Level of Under- standing | Student error |
|---|---|
| Level 1 | Makes errors that reflect focus on decoding and retrieving facts or details that are not necessarily related to the text or item. Student invokes prior knowledge related to the general topic of the passage, but response is not text based. These errors indicate that the student is grabbing bits and pieces of the text as he or she understands them, but the pieces are unrelated to the information required by the question being asked. |
| Level 2 | Makes errors that reflect initial understanding of facts or details in the text, but inability to relate them to each other or apply them to come to even a weak conclusion or inference. |
| Level 3 | Makes errors that reflect analysis and interpretation, but conclusions or inferences arrived at are secondary or weaker than ones required for correct response. |
| Level 4 | Correct response |

In order to differentiate between the three distractors, it is preferred when possible to clearly and distinctly distinguish between the kinds of errors reflected in the distractors. That is, if all three distractors reflect the same kind of error, the item cannot differentiate between students who choose an incorrect answer. However, if the three distractors reflect different types and levels of errors, a pattern may develop in the student's answer choices that will reflect a clear misconception or a type of weakness that will allow an instructor to make a targeted intervention for that student.

Example 1. A first vocabulary item might read:

Read this sentence from the story "Where Robins Fly."

Sally sat in the park and saw a flock of robins fly overhead.

What word has the same meaning as park as it is used in this sentence?

A dark [Level 1: look- and sound-alike word]

B garage [Level 2: related to multiple meaning of park (the car)]

C woods [Level 3: related to the meaning, but not precise]

D playground [Level 4: correct response]

Example 2. A second vocabulary item might read:

Read this sentence from the story "Frogs and Toads."

Both frogs and toads have a tail at first that disappears when they get older.

What word has the same meaning as disappears as it is used in this sentence?

A disagrees [Level 1: look-alike word]

B can be seen [Level 2: antonym]

C becomes small [Level 3: related to the meaning, but not precise]

D vanishes [Level 4: correct response]

In traditional multiple-choice test questions, each of the distractors would be at one of these levels depending upon the difficulty target of the question. Here, the distractors are all at different cognitive levels.

Example 3. A content standard for identifying the main idea of a passage might read:

What is the main idea of the story "The Tortoise and the Hare"?

A Turtles and rabbits make good pets. [Level 1: related to title and prior knowledge]

B Turtles run more slowly than rabbits. [Level 2: text-based detail unrelated to main idea]

C Anyone can win an important race. [Level 3: related to secondary theme]

D Slow but steady progress can pay off. [Level 4: correct response]

In a traditional multiple-choice test question, each of the distractors would likely be at Level 3 for grades 3–12 and each at Level 2 for grades 1 and 2.

Example 4. A sequence item related to a passage might read:

In the recipe for making chocolate chip cookies, what should the baker do right after the cookies go in the oven?

A Get the milk and get ready to eat them. [Level 1: related to prior knowledge]

B Set the temperature of the oven to 350 degrees. [Level 2: misunderstanding of sequence word]

C Take them out to cool. [Level 3: skipped a step]

D Set the timer for 15 minutes. [Level 4: correct response]

In a traditional multiple-choice test question, each of the distractors would likely be at Level 3.

Tables 2A and 2B provide an exemplary breakdown on a grade-by-grade basis of reading concepts.

TABLE 2A

Reading Instructional Themes for Interim Assessments by Grade Level (Grades 3, 4, 5)

|  |  | Grade 3 | Grade 4 | Grade 5 |
|---|---|---|---|---|
| Instructional Themes | A | Decode long words, Narrative elements, Elements of nonfiction | Narrative elements, Prefixes, suffixes, and roots, Locate information | Prefixes, suffixes, and roots, Narrative elements, Make judgments |
|  | B | Author's purpose, Word relationships, Decode long words | Cause and effect, Narrative elements, Summarize | Draw conclusions, Summarize and paraphrase, Narrative elements |
|  | C | Sequence, Prefixes and suffixes, Narrative elements | Compare and contrast, Draw conclusions, Summarize | Prefixes, suffixes, and roots, Graphic aids, Text structure: Main idea and details |
|  | D | Summarize, Compare and contrast, Author's purpose | Main ideas and details, Sequence, Compare and contrast | Word relationships, Fact and opinion, Text structure: Main idea and details |
|  | E | Fact and opinion, Main idea and details, Compare and contrast | Author's purpose, Elements of nonfiction, Sequence | Text structure: Compare and contrast Author's purpose and perspective, Draw conclusions |
|  | F | Summarize, Cause and effect, Locate information | Author's purpose, Fact and opinion, Word relationships | Connotation/Denotation, Cause and effect, Summarize and paraphrase |
|  | G | N/A | N/A | N/A |
|  | H | N/A | N/A | N/A |

TABLE 2B

Reading Instructional Themes for Interim Assessments by Grade Level (Grades 6, 7, 8)

|  |  | Grade 6 | Grade 7 | Grade 8 |
|---|---|---|---|---|
| Instructional Themes | A | Prefixes, suffixes, and roots, Narrative elements, Make judgments | Short stories, Draw conclusions, Make predictions, Make generalizations | Conflict, Literary devices, Figurative language, Main idea and details |
|  | B | Narrative elements, Literary devices, Summarize and paraphrase | Nonfiction, Comparing and contrasting, Making predictions | Character traits, Making inferences, Main idea and details |
|  | C | Prefixes, suffixes, and roots, Graphic aids, Text structure: Main idea and details | Point of view, Making predictions, Character and internal conflict | Plot, Author's purpose, Making predictions, Foreshadowing |
|  | D | Text structure: Compare and contrast, Literary devices, Word relationships | Drama, Characterization, Author's purpose | Point of view, Vocabulary in context |
|  | E | Author's purpose and perspective, Draw conclusions, Word relationships | Poetry, Literary devices, Fact and opinion | Drama, Literary devices, Using prior knowledge |
|  | F | Text structure: Cause and effect, Fact and opinion, Draw conclusions | Main idea, Author's purpose and craft | Poetry, Suffixes and prefixes, Literary devices, Figurative language, Folk tales |
|  | G | N/A | Thinking beyond the text, Characteristics of myths and fables, Author's purpose and craft | Historical fiction, Sound devices, Traits of heroes |
|  | H | N/A | Characteristics of folk tales, Making predictions, Drawing conclusions | Nonfiction, Fact and opinion |

Table 3 provides, for the subject of mathematics, a four-level distractor rational taxonomy that would be appropriate for designing a four-option multiple-choice test question with one correct and three incorrect answers. It will be clear to one of skill in the art that a similar table could be developed for questions having a different number of choices.

TABLE 3

| Level of Misunder-standing | Student error |
| --- | --- |
| Level 1 | Makes errors that reflect combinations of conceptual misunderstanding and unfamiliarity with how to relate operational procedures to problem contexts. Student attempts to implement strategies that are unrelated to the task at hand. These errors may indicate that the student has an inordinate dependence on information that is explicitly stated in item stimuli, and is lacking the sophistication required by the question being asked. |
| Level 2 | Makes errors that reflect some sophistication and computational ability, but that demonstrate an inadequate conceptual framework and flawed reasoning in support of conclusions or inferences. |
| Level 3 | Makes errors that reflect definite levels of sophistication in analysis and conceptual knowledge, but that are flawed by inconsistent reasoning or computational weakness. |
| Level 4 | Correct response |

Example 5. A number and operation item might read:

Janice spent $222.46 before tax to buy a climbing rope that sold for $3.50 per meter. What was the greatest number of meters of the rope she could buy at that rate?

A 7786.1 m [Level 1: incorrect operation with place value error]

B 778.61 m [Level 2: incorrect operation, correctly applied]

C 635.6 m [Level 3: correct operation with place value error]

D 63.56 m [Level 4: correct response]

In a traditional item, each of the three distractors would typically be based on a computation error related to place value.

Example 6. A data analysis item might read:

Dean surveyed students at a leadership conference on the transportation they used to travel to the downtown conference center, with the result that 60% came by car, 15% by subway, 15% by train, and 10% by bus. If 254 students responded that they traveled to the conference by bus, how many more students are in the group who traveled by car than the combined groups who traveled by subway or train?

A 30 [Level 1: student based calculation on percentages, 60−(15+15)]

B 762 [Level 4: correct response]

C 1524 [Level 2: student simply calculated 60% of total, the number who traveled by car]

D 2159 [Level 3: student calculated 15% of total but subtracted it from total]

In a traditional multiple-choice test question, the three distractors would typically be based on a limited understanding of the data represented and the mathematics required to solve the problem.

Example 7. A probability item might read:

Each student in Benson Middle School cast one vote for team name. The table below shows the results of the voting.

| Team name | Number of votes |
| --- | --- |
| Cobras | 256 |
| Stallions | 64 |
| Bobcats | 40 |
| Eagles | 64 |

If one student who voted is randomly selected, what is the probability that he or she did not vote for Cobras?

A 21/53 [Level 4: correct response; reduced ratio of "not Cobras" to total number of votes cast]

B 21/32 [Level 3: reduced ratio of "not Cobras" to "Cobras"]

C 1/168 [Level 2: ratio of one to "not Cobras"]

D 1/256 [Level 1: ratio of one to "Cobras"; first value in table]

In a traditional multiple-choice test question, the three distractors would typically reflect invalid "shortcuts" students may adopt in lieu of applying a genuine understanding of experimental probability.

Tables 4A and 4B provide an exemplary breakdown on a grade-by-grade basis of reading concepts.

TABLE 4A

Mathematics Instructional Themes for Interim Assessments by Grade Level (Grades 3, 4, 5)

| | | Grade 3 | Grade 4 | Grade 5 |
| --- | --- | --- | --- | --- |
| Instructional Themes | A | Number Concepts & Number Theory | Addition/Subtraction, Number Concepts, Number Theory | Addition/Subtraction, Number Concepts & Number Theory |
| | B | Data Analysis | Data Analysis | Data Analysis & Probability |
| | C | Money and Time Concepts | Multiplication Operations | Basic Algebra |
| | D | Multiplication Operations | Division Operations | Multiplication/Division Concepts |
| | E | Measurement Concepts | Measurement Concepts | Measurement Concepts |
| | F | Division Operations | Fraction & Decimal Operations | Operations with Fractions and Decimals |
| | G | Geometry Concepts | Geometry Concepts | Geometry Concepts |
| | H | Fraction & Decimal Concepts | Basic Algebra | Ratios, Proportions, and Percents |

TABLE 4B

Mathematics Instructional Themes for Interim Assessments by Grade Level (Grades 6, 7, 8)

| | | Grade 6 | Grade 7 | Grade 8 |
|---|---|---|---|---|
| Instructional Themes | A | Number Concepts & Number Theory | Algebraic Concepts | Algebraic Equations and Inequalities |
| | B | Data Analysis & Probability | Data Analysis & Probability | Data Analysis & Probability |
| | C | Operations with Fractions & Decimals | Integers | Rational & Real Numbers |
| | D | Ratios, Proportions & Percents | Rational Numbers | Proportional Reasoning & Percents |
| | E | Perimeter, Circumference, Area & Volume | Proportional Reasoning & Percents | Perimeter, Circumference, Area, Volume & Pythagorean Theorem |
| | F | Operations with Integers | Perimeter, Circumference, Area, Volume & Surface Area | Operations with Integers & Exponents |
| | G | Plane Geometry | Plane Geometry | Plane Geometry |
| | H | Algebra Concepts & Coordinate Geometry | Algebraic Functions & Graphs | Algebraic Functions & Graphs |

The item design methodology of the present invention enables teachers to identify specific breakdowns in understanding for each student who does not answer an item correctly, and then to make specific, direct, and immediate instructional decisions to help each student move to the next level and then to the correct answer.

In addition, students can be grouped for instruction based upon a shared breakdown in understanding. The correlational information obtained solves a traditional dilemma of how to group students for instruction in ways that build common understanding and support learning.

It will be understood by one of skill in the art that for some content standards there may be a limited number of ways in which to write incorrect answers. For example, for one-column addition without regrouping (e.g., 3+3=x), the incorrect answers would likely be addition operation errors stemming from various strategies students employ to solve basic calculations. Similarly, for a test question that measures the spelling of two-syllable words, the incorrect answers are likely to be incorrectly spelled versions of the word in the test question stem (e.g., Misisippi, Mississipi, Mississippi, etc.).

Therefore, because each item is written to assess a particular learning standard that may focus on a very simple or a very complex task, there will also be a range of types of distractor rationales. Some very simple, cognitive Level 1 items may ask for student recall. In that case, there will be little distinction among the incorrect options. For more complex items, however, a range of distractors that reflect a spectrum of cognition is possible.

In one aspect of the invention, the item design scheme is used (block 101) to create a first type of assessment, an "interim" assessment, for testing a set of specific concepts in a content area as described above. Preferably a plurality of such interim assessments is created (block 102). Each assessment includes a plurality of multiple-choice test items. Each item comprises an item stem (the "question"), a unitary correct answer, and a plurality of distractors. As discussed above, at least two, and preferably all, of the distractors are directed to disparate cognitive levels.

For each administration of an interim assessment, a correlation is performed on a first set of distractors that were selected by a student (block 108). Such a correlation identifies the presence of a possible problem in a cognitive level that has been achieved by the student in a particular concept related to the first set of distractors. Preferably the scaling and linking design uses item response theory (Rasch model) as the basis for calibration, linking, and scaling.

Based upon this first correlation, a remediative regime can be prescribed for the student (block 110). This regime may also take into account input from the student as to why that concept has proved difficult (block 109). For example, did the student miss some days of school when that concept was taught? Was there some other problem being experienced by the student on the day the assessment was administered?

Another correlation performed by the invention includes correlating a second set of distractors that were selected by an entire class being taught by a particular teacher (block 111). This correlation can identify the presence of a systemic problem in understanding a concept, and also whether there are groups of students having problems in a particular concept. Armed with this knowledge, the teacher can then be presented with a remediative regime for the entire class (block 112). Alternatively, the class can be subdivided into groups based upon this correlation, so that the subdivisions can be remediated in this concept.

Preferably the interim assessment is presented several times (blocks 113,114) prior to the administration of a high-stakes test, for example, 6–8 times. Open-ended items may also be included. A third correlation (block 115) can then be made of the selected distractors across multiple administrations of the interim assessments.

A second aspect of the invention includes another type of assessment to be administered (block 116) in preparation for the administration of a high-stakes test such as are at present given, for example, state-wide (e.g., the Florida FCATs). This "benchmark" assessment preferably has a format substantially identical to that of the high-stakes test (blocks 103,104). Such a similar format accomplishes two things: It prepares the students for the high-stakes test format, and it provides an indication of the students' preparedness for the high-stakes test, identifying students who may be at risk for performing below a predetermined standard. Such an identification can be used to prescribe a remediative regime for these at-risk students.

Preferably the benchmark assessment has fewer test items than the high-stakes test, and thus takes less time to administer, typically, for example, one class period. In a particular embodiment, the benchmark assessments will be administered twice preceding the high-stakes test, with the interim assessments being administered 3–4 times before the administration of each of the benchmark assessments (Table 5).

TABLE 5

Overview of Exemplary Assessment Administration

| | Benchmark | Interim |
|---|---|---|
| Grade levels | 3–8 | 3–8 |
| Number of forms | 2 parallel forms | 6–8 unique forms* |
| Content areas | Reading, Mathematics, Science | Reading, Mathematics, Science |
| Purpose | Indicate future performance on high-stakes assessment | Diagnose student strengths and weaknesses to prescribe instructional actions |
| Length | ~30–35 items per form | 30 MC + 2 optional OE |
| Administration time | One class period | One class period |
| Use | Choose administration times for benchmarking student progress | Flexible to administer as matched to the curriculum pacing plan |

The assessments of the present invention 10 may be delivered (blocks 105,116), administered (blocks 106,117) and scored (blocks 107,118) in a number of ways, making their administration very flexible. Typically assessments are created using assessment creation software 11 and stored at a central site 12 housing a processor 13 and database 14. In one embodiment of the system 10 (FIG. 1), assessments are printed 15 and mailed 16 to a school site 17, where they are administered in a traditional manner in hardcopy, mailed back, and scored 18 at the central site 12.

Figure 1:
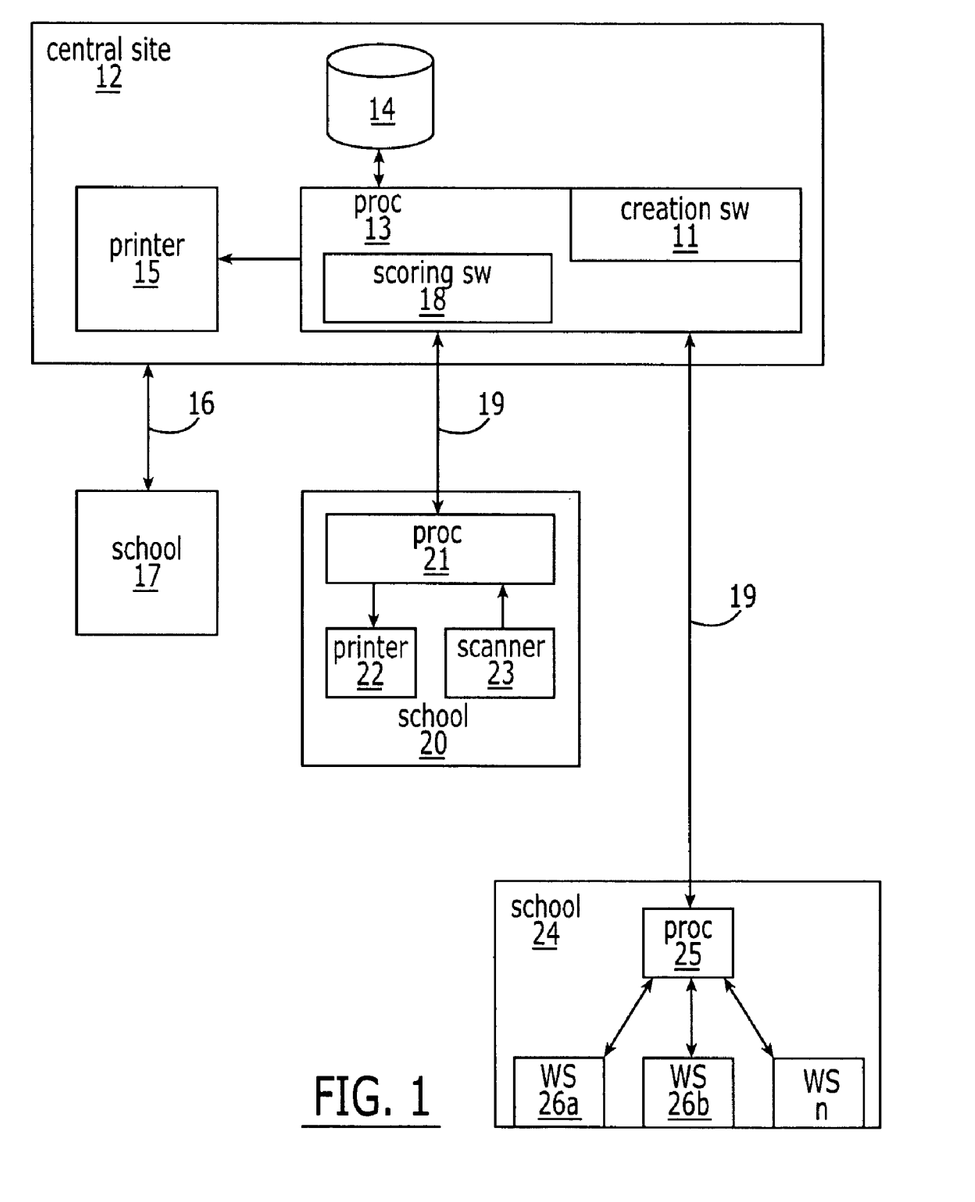
FIG. 1 is a system schematic of the present invention.
Figure 2A:
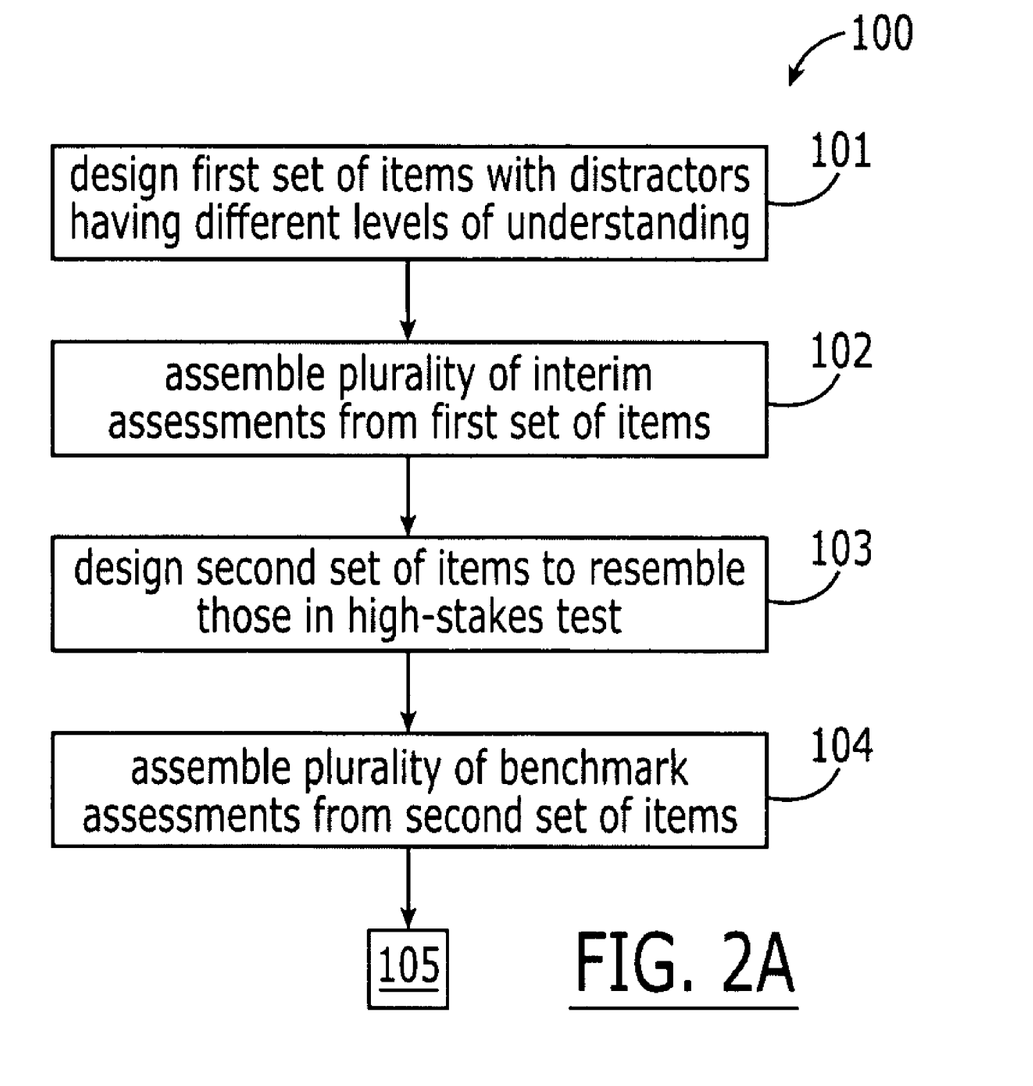
FIGS. 2A–2B is a flowchart of the method of the present invention.
Figure 2B:
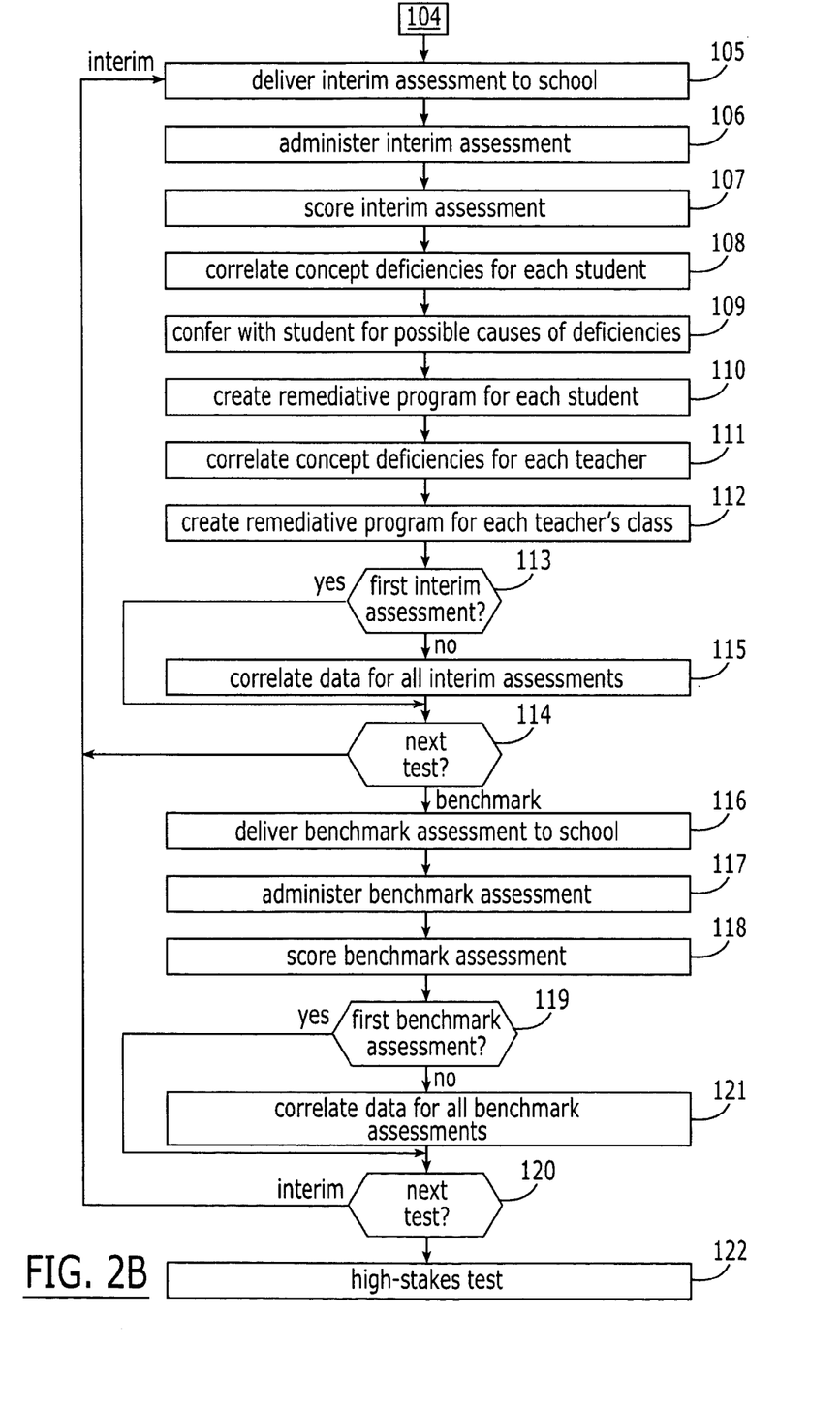

In another embodiment, assessments are delivered electronically via a network such as the Internet 19 to a school site 20 processor 21, where they are printed 22 and delivered in hardcopy. Scoring may then be done from scanner 23 output in the local processor 21, or at the central site 12, which at the present time is believed to represent the preferred embodiment.

In a further embodiment, assessments are again delivered electronically via a network such as the Internet 19 to a school site 24 processor 25, from which they are delivered selectively to a plurality of workstations 26a, 26b . . ., with answers collected electronically. Again, scoring may be done locally 25 or at the central site 12.

Another aspect of the present invention includes the reporting of results of the assessments. The reports that can be provided are rich in information that can be generated automatically by the system 10, with multiple cross-linking for viewing ever-finer detail as desired. The interim assessment reports comprise individual student-level, roster-level (classroom), and group-level (school or school system) information that can be made available to students, teachers, parents, and administrators as desired.

The interim assessment reports include the number of correct answers, the percent correct, and scaled scores that are linked to a predetermined scale, such as, but not intended to be limited to, the Stanford Scale. The scale score permits users to track student progress over time in a content area as the students gain higher levels of mastery over standards-based curriculum materials.

Reporting is provided for item analysis, which gleans qualitative information on students' choice of distractors. The rationale for each item response has been carefully identified and field tested to inform teachers on specific areas of student misconceptions in learning. Teachers and administrators can view trends in individual and class responses that indicate gaps in student understanding, and also error reports by assessment and standard, which display responses by rationale, and even disaggregate data that list the students who respond in similar patterns to items.

In order to track the performance of subgroups of students towards AYP targets, users can disaggregate data by standard NCLB categories, including ethnicity, gender, economic status, language proficiency, and special needs.

Figure 3:
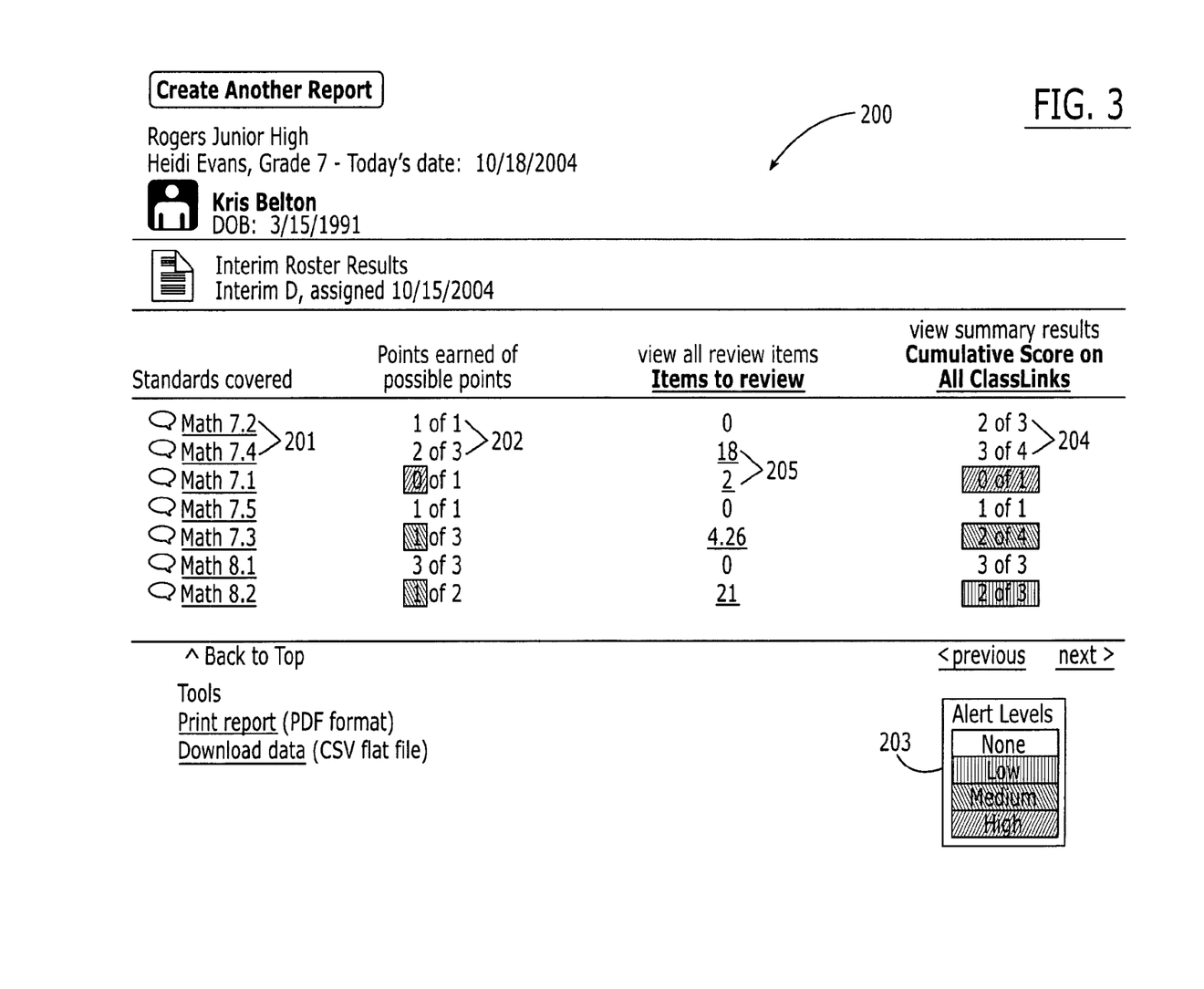
FIGS. 3–8 are exemplary reports for interim assessments.

FIGS. 3–8 are exemplary reports available for interim assessments, although these are not intended to be limiting. FIG. 3 is a single-student report 200 for an interim assessment ("D") in math. Codes 201 for each of the standards covered are linked, as will be shown in the following, to an explanation of the standard. The second column lists the points earned 202, color-coded for "alert levels" 203. Cumulative scores 204 are provided in the fourth column, again color-coded for alert levels 203. This column represents data from all the interim assessments given to that point. Items to review 205 (if any) are given, with hot links to each item, a selection of which brings up FIG. 4, a report 206 that contains a representation of the question asked 207, an indication of the correct answer 208, and the student answer 209. In addition, the item response rationale 210 is provided.

Figure 4:
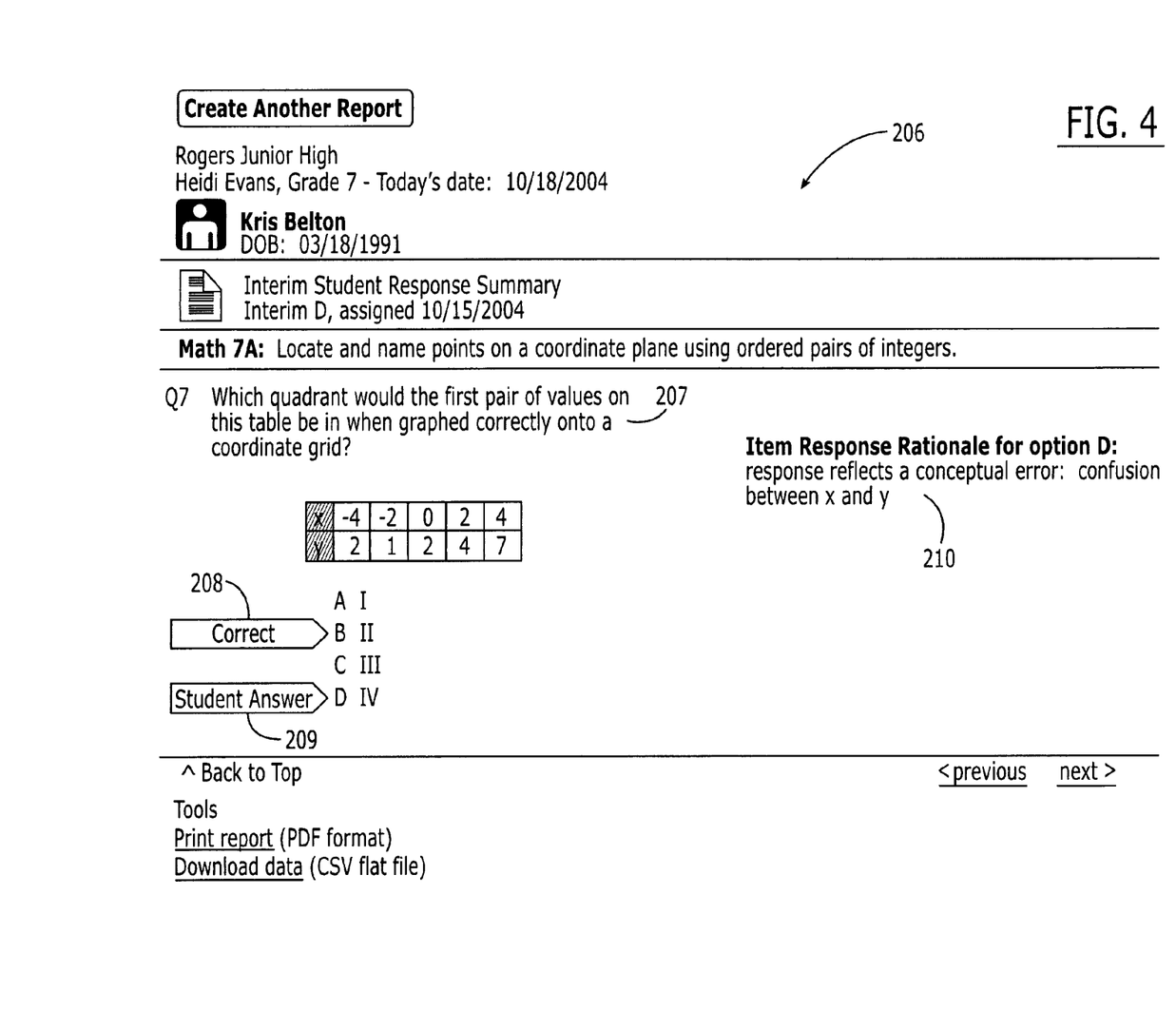
Figure 5:
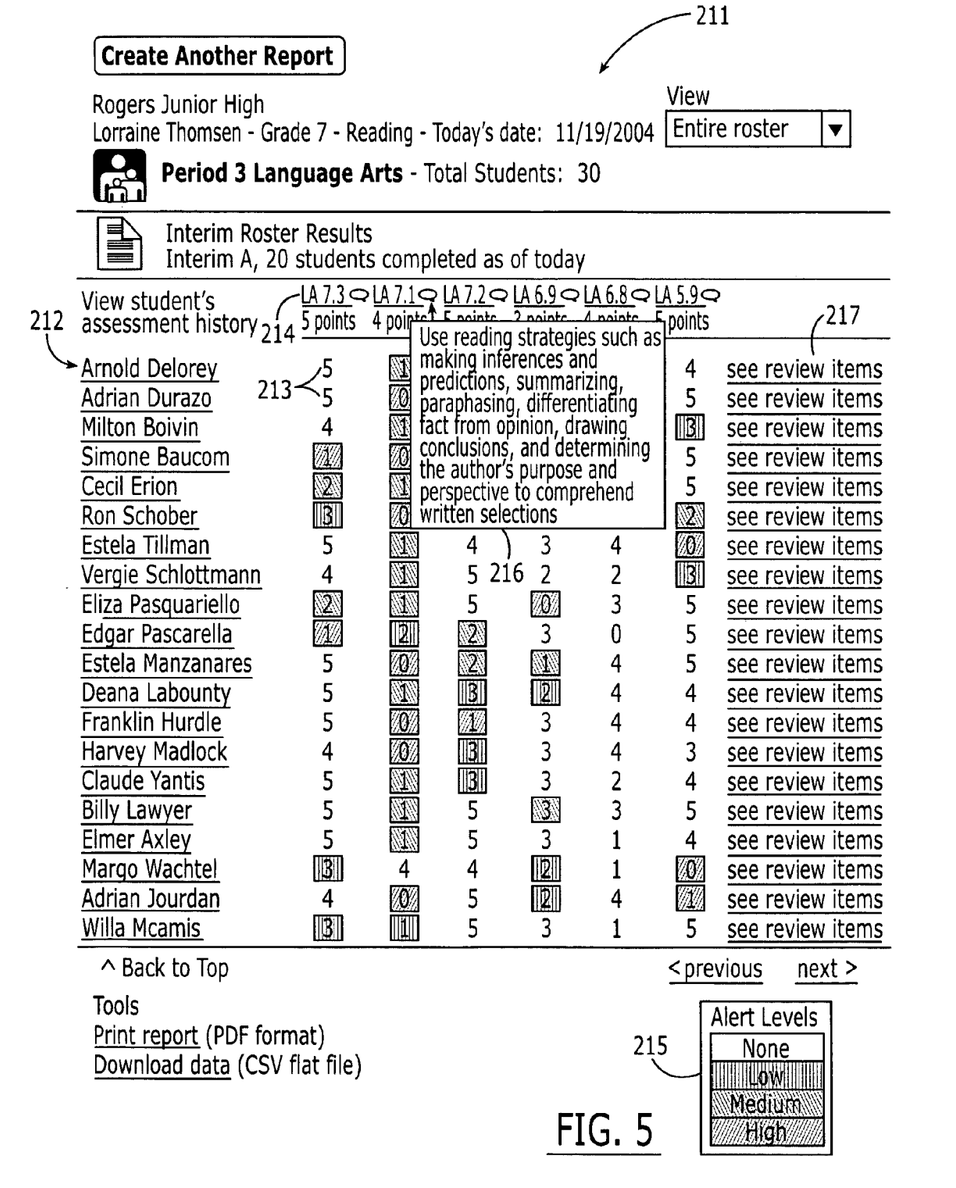

FIG. 5 is an exemplary report 211 for an entire language arts class on one interim assessment ("A"), listing the students 212, each hot-linked to his/her own record as in FIGS. 3 and 4, the number of points earned 213 for each concept 214, again with color-coded alert levels 215. Each of the concepts 214, when pointed to by the cursor, brings up an explanation 216. Also provided is a hot link to the review items 217 associated with each student.

Figure 6:
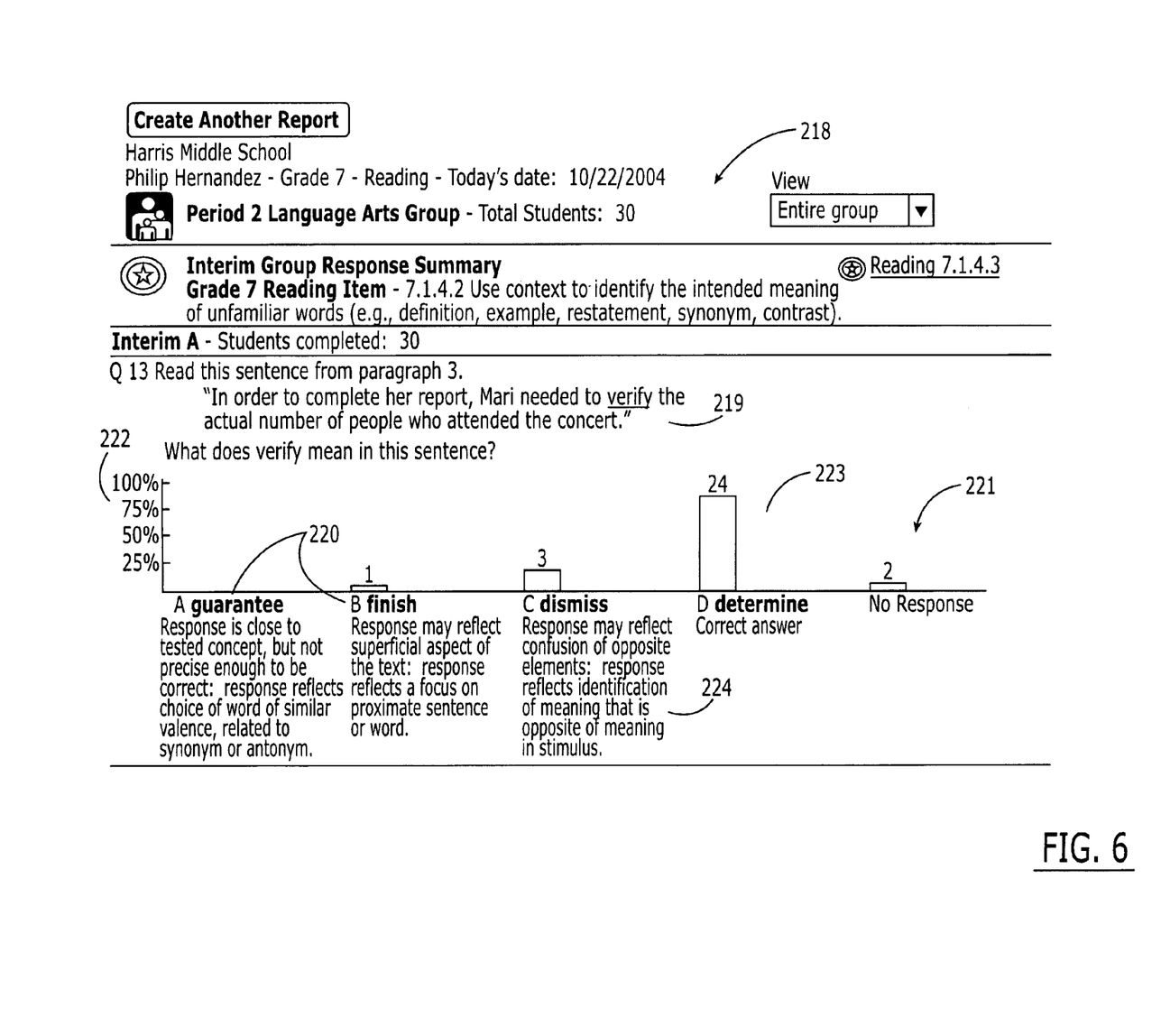
Figure 7:
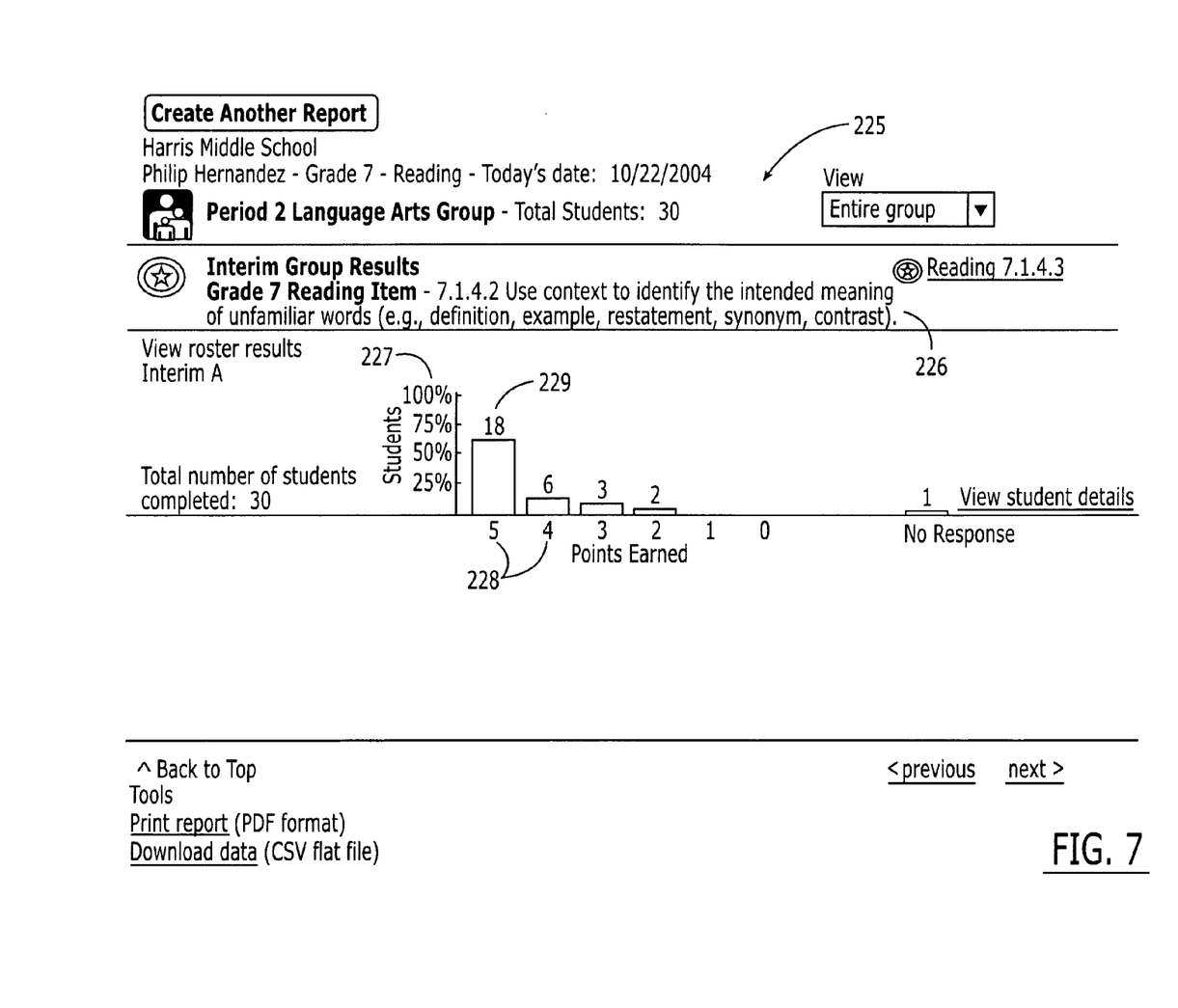

FIGS. 6 and 7 are summary reports for a class or group of students, broken out by individual items. In FIG. 6, the report 218 reproduces the item stem 219. The response options 220 form the abscissa of a bar graph 221, along with "no response," versus the percentage 222 of the class that gave each respective answer, with the correct answer 223 highlighted. Also provided below each response option 220 is an explanation 224 for the choice of each distractor.

In FIG. 7, the report 225 groups results by concept 226, giving a percentage 227 of the group earning a number of points 228, as well as the number of students 229 in each category.

Figure 8:
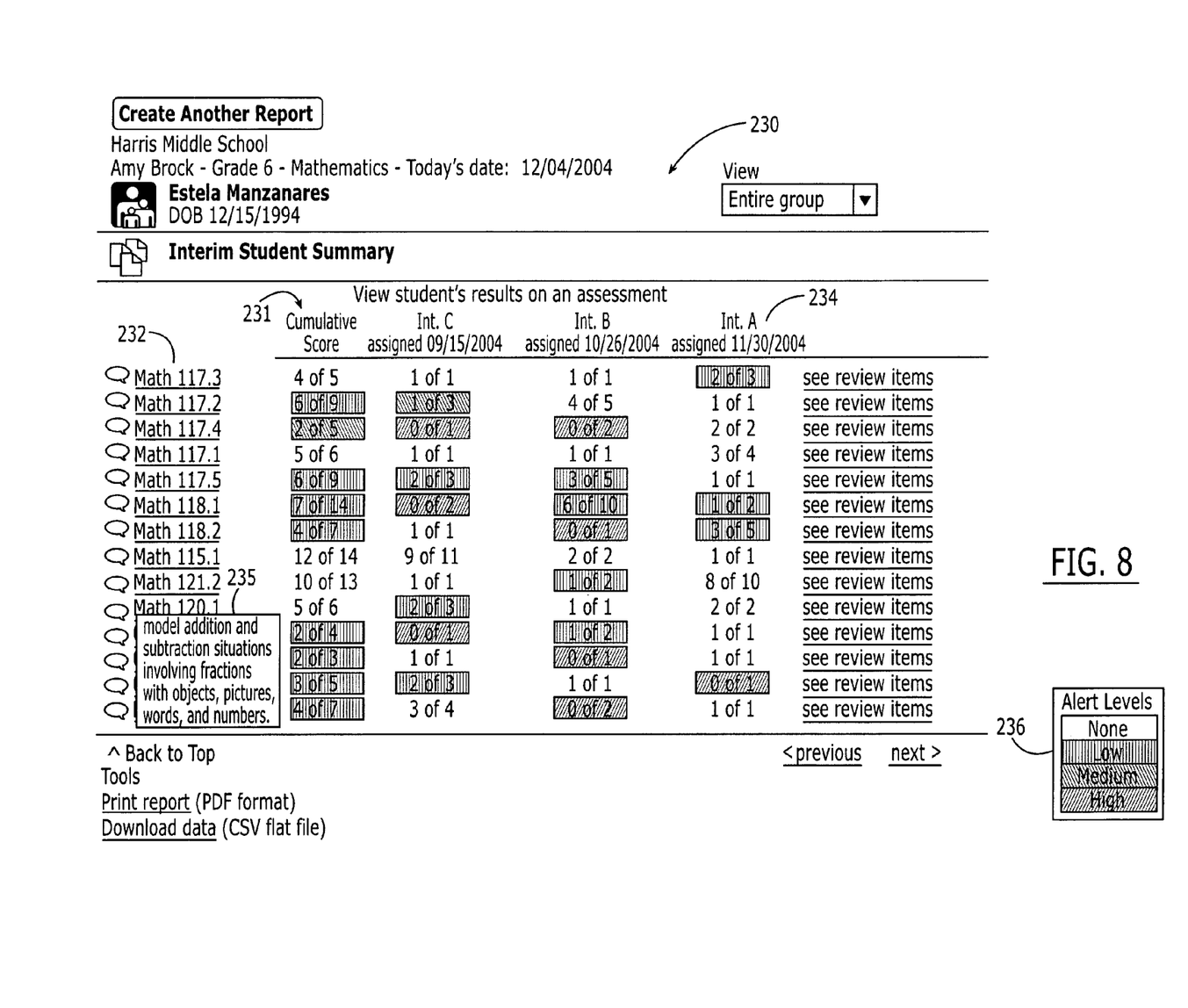

As discussed, reports can also be generated across a plurality of interim assessments, such as that 230 shown in FIG. 8, showing cumulative scores 231 for each concept 232 and individual point scores 233 for each assessment 234. Again, information 235 on each concept may be obtained by lingering on the concept listed, and alert levels 236 are provided.

Figure 9:
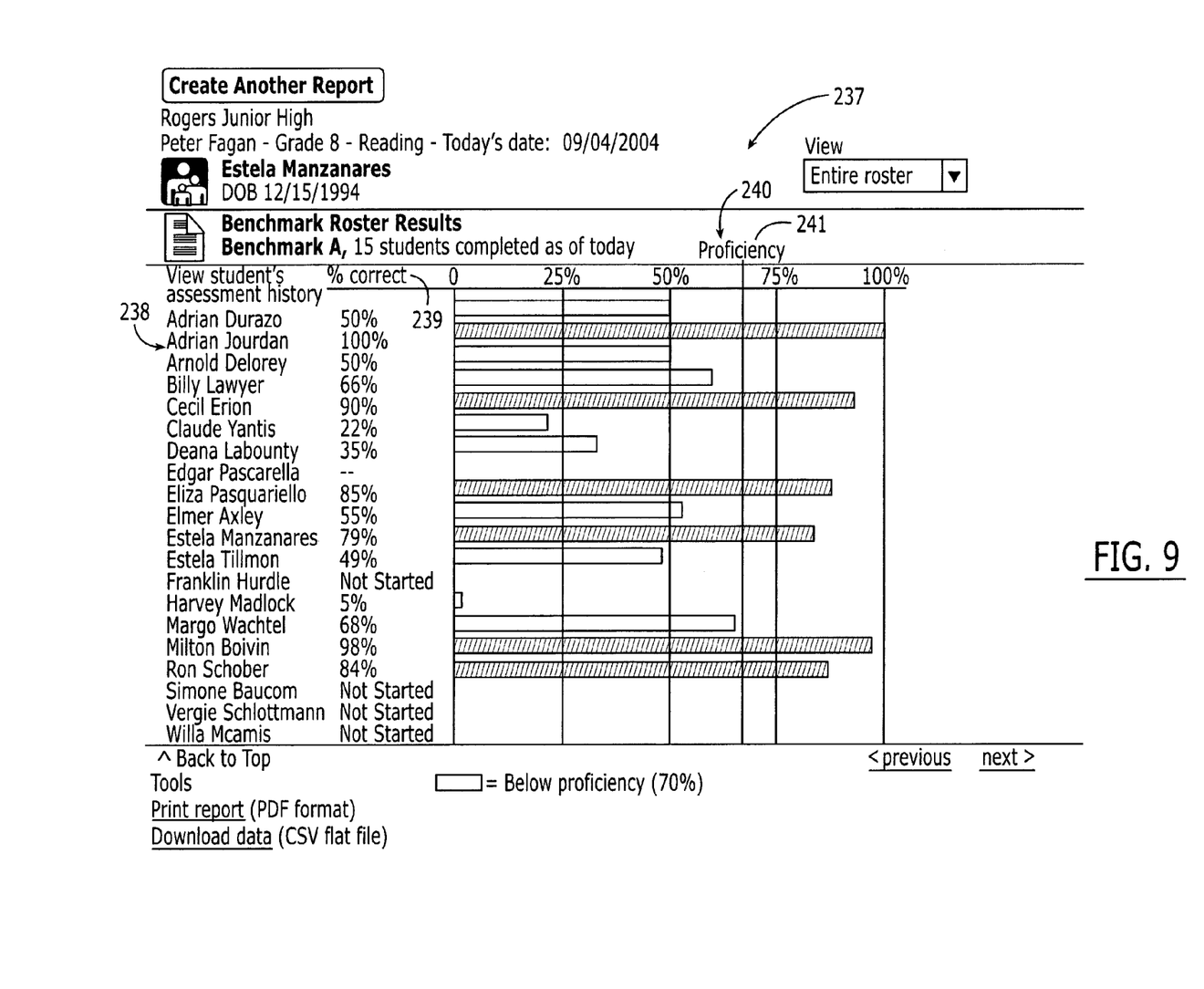
FIGS. 9 and 10 are exemplary reports for benchmark assessments.
Figure 10:
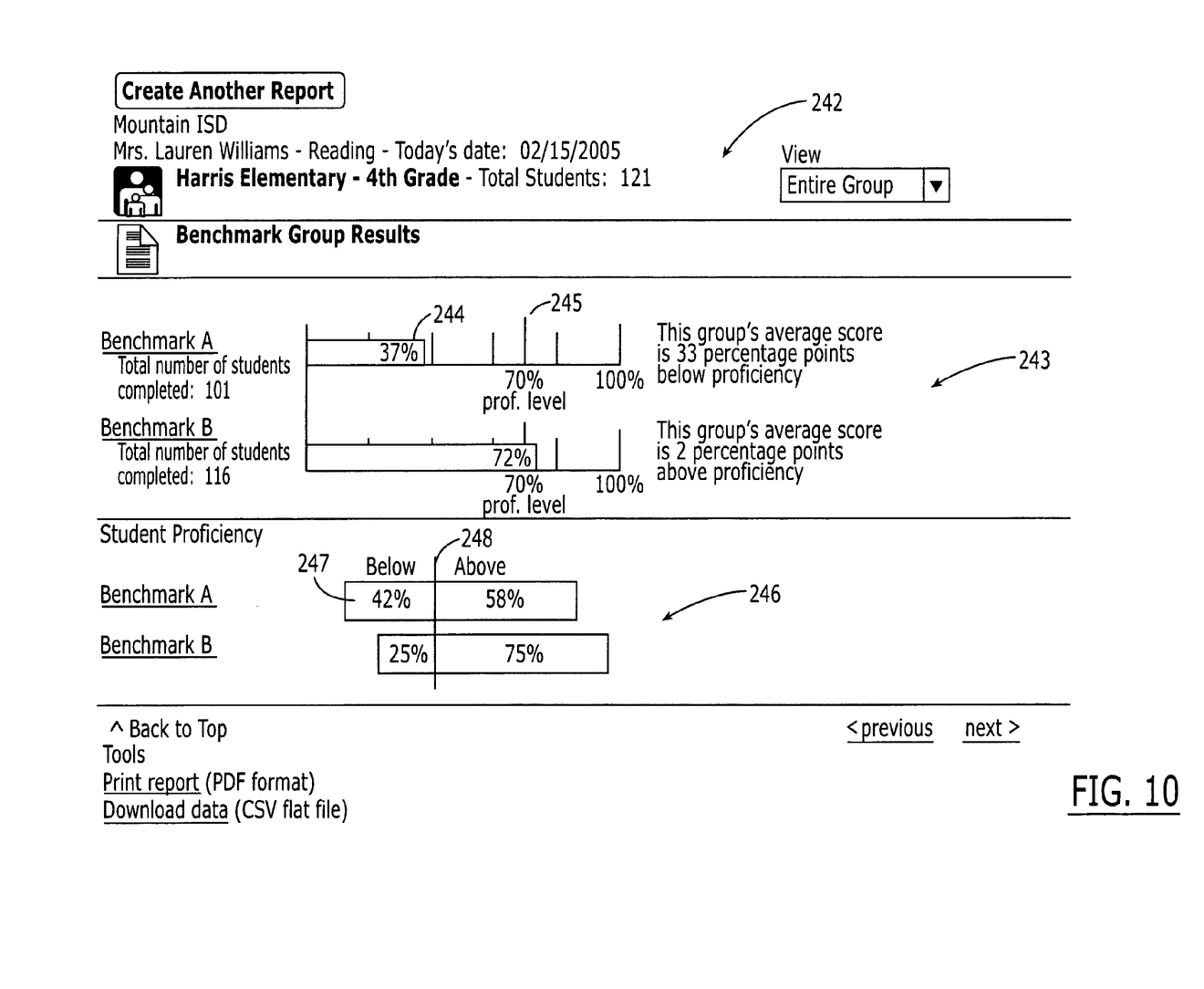

FIGS. 9–11 are exemplary reports available for benchmark assessments, although these are not intended to be limiting. FIG. 9 is a report 237 for a single benchmark assessment ("A"), for an entire class, with a listing of student names 238, the percent correct earned by each student 239, and the percentage presented graphically 240, color-coded for above and below proficiency 241 (here, 70%). As above, hot links are provided for each individual student's name to display an individual report.

A group report 242 is shown in FIG. 10 for two benchmark assessments ("A" and "B"). The first set of graphs 243 shows the group's average score 244 relative to proficiency 245; the second set of graphs 246 shows the percentage 247 of students above and below proficiency 248 for each assessment.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details disclosed herein.

Having now described the invention, the operation and use of preferred embodiments thereof, and the advantageous new and useful results obtained thereby, are set forth in the appended claims.

What is claimed is:

1. A method for tracking student learning comprising the steps of:
    (a) administering an interim assessment to a student, the assessment for testing a set of specific concepts in a content area, the assessment comprising a plurality of multiple-choice test items, each test item comprising an item stem, a unitary correct answer, and a plurality of distractors, the distractors having been constructed using a multi-level taxonomy of cognitive levels, at least two of the distractors directed to disparate cognitive levels; and
    (b) automatically correlating a first set of distractors selected by the student to determine a presence of a possible problem in a cognitive level achieved by the student in a particular concept to which items encompassing the first set of distractors are directed.

2. The method recited in claim 1, further comprising the step of providing a remediative regime for each student based upon the correlation of step (b), the remediative regime comprising review material geared to the cognitive level associated with each selected distractor.

3. The method recited in claim 1, wherein the student comprises a plurality of students being taught by a teacher, and further comprising the step of:
    (c) automatically correlating, for the teacher, a second set of distractors selected by the plurality of students to determine a presence of a possible problem in a cognitive level achieved by a significant number of the students in a particular concept to which items encompassing the second set of distractors are directed.

4. The method recited in claim 3, further comprising the step of providing an instructional regime for each teacher based upon the correlation of step (c).

5. The method recited in claim 3, further comprising the steps of subdividing the plurality of students based upon the correlation of step (c) and providing an instructional regime for each subdivision.

6. The method recited in claim 1, further comprising the step of obtaining input from each student on a possible cause for a result obtained from the correlation of step (b).

7. The method recited in claim 6, further comprising the step, following the input-obtaining step, of providing a remediative regime for each student based upon the possible cause and the correlation of step (b).

8. The method recited in claim 1, further comprising the steps of:
    repeating steps (a) and (b) at predetermined intervals; and
    automatically correlating a third set of distractors selected by the student on at least two of the administered assessments to determine a presence of a possible problem in a cognitive level achieved by the student in a particular concept to which items encompassing the third set of distractors are directed.

9. The method recited in claim 1, wherein each of the distractors is directed to a disparate cognitive level for at least some of the items.

10. The method recited in claim 1, further comprising administering at least one benchmark assessment to the plurality of students in preparation for an administration of a high-stakes test, the benchmark assessment comprising a format substantially identical to a format of the high-stakes test, and having fewer test items than a number of test items on the high-stakes test.

11. The method recited in claim 10, further comprising the steps of scoring the benchmark assessment and determining if any of the plurality of students is at risk of performing below a predetermined standard on the high-stakes test.

12. The method recited in claim 11, further comprising the step of providing a remediative regime for any student determined to be at risk of performing below a predetermined standard on the high-stakes test.

13. The method recited in claim 1, further comprising the step of providing the assessment in electronic form from a remote source, and wherein the administering step comprises printing the assessment, administering the printed assessment to the student, and collecting a completed assessment from the student.

14. The method recited in claim 13, further comprising the steps of scanning the completed assessment form to collect assessment student answer data therefrom and storing the answer data, and wherein step (b) is performed on the answer data.

15. The method recited in claim 1, further comprising the steps of providing the assessment in electronic form from a remote source and loading the assessment onto a processor, and wherein step (b) comprises administering the assessment electronically.

16. The method recited in claim 1, further comprising the step of providing an electronically generated summary report including for each of the content area concepts a summary of student achievement on the interim assessment.

17. The method recited in claim 16, wherein the report further comprises, for each content area concept for which a distractor was selected by the student, means for generating an item report including a representation of an incorrectly answered item, including indicia indicating a correct answer, the student-selected distractor, and an item response rationale correlating with the taxonomy level of the student-selected distractor.

18. A method for constructing an interim assessment for tracking student learning comprising the steps of:
constructing a multi-level taxonomy of cognitive levels for each of a plurality of concepts in an area desired to be tested; and
constructing a plurality of multiple-choice test items addressing at least some of the plurality of concepts, each test item comprising an item stem, a unitary correct answer, and a plurality of distractors, the distractors having been constructed using the multi-level taxonomy of cognitive levels, at least two of the distractors directed to disparate cognitive levels, each distractor correlating with at least one of the cognitive levels.

* * * * *